United States Patent [19]

Takeshita

[11] 4,117,659

[45] Oct. 3, 1978

[54] DISPLAY CELL

[75] Inventor: Hiroshi Takeshita, Suwa, Japan

[73] Assignee: Kabushiki Kaisha Suwa Seikosha, Tokyo, Japan

[21] Appl. No.: 683,444

[22] Filed: May 5, 1976

[30] Foreign Application Priority Data

May 7, 1975 [JP] Japan ................................. 50-55099

[51] Int. Cl.$^2$ ............................ G04C 3/00; G02F 1/23
[52] U.S. Cl. .................. 58/23 R; 58/50 R; 350/357; 252/62.2
[58] Field of Search ............ 240/6.43; 58/50 R, 23 R; 350/160 R, 357; 252/300, 62.2; 204/242

[56] References Cited

U.S. PATENT DOCUMENTS

| 3,293,506 | 12/1966 | Chestnot | 252/62.2 X |
|---|---|---|---|
| 3,652,149 | 3/1972 | Rogers | 350/160 R |
| 3,912,368 | 10/1975 | Ponjee et al. | 350/160 R |
| 3,961,842 | 6/1976 | Jasinski | 350/160 R |
| 3,973,388 | 8/1976 | Yoshida et al. | 58/50 R |

OTHER PUBLICATIONS

Robinson et al., "Electrolyte Solutions", Acad. Press, 1959, pp. 546-548.

*Primary Examiner*—Jack Cooper
*Attorney, Agent, or Firm*—Blum, Moscovitz, Friedman & Kaplan

[57] ABSTRACT

The operating life of an electrochromic display cell is greatly lengthened by incorporating a buffer in the electrochromic solution. The buffer prevents local changes in pH which are shown to be responsible for termination of the operability of electrochromic display cells after a limited number of display cycles.

4 Claims, 6 Drawing Figures

DISPLAY CELL

BACKGROUND OF THE INVENTION

With the development of electronics techniques, there has been a concomitant development of a need for digital display devices which can be read at all levels of light intensity, which consume but little power and which have long operating life times. Thus far, liquid crystals and light-emitting diodes have been used as the bases of such devices. The liquid crystal device suffers from the defect that the display produced is of low contrast so that it is difficult to read and, moreover, cannot be seen at all at low light levels. As for the light-emitting diode type of display, the power consumption is high which makes it difficult to use as a continuous display in small devices powered by a battery. Such devices are electronic calculators and wristwatches.

Recently, display cells based on electrochromic (hereinafter termed "EC") elements have been developed. Such display cells have low power consumption and provide a display which is readily visible at most light levels.

The principal difficulty with such EC devices is the relatively short lifetime as measured in display cycles. The difficulty becomes apparent in that reversal of the voltage intended to erase the image results only in partial erasure so that there is an after-image which remains visible.

As is evident, it would be highly desirable that a means of overcoming this difficulty with respect to the EC display be developed, in view of the fact that the power consumption of such a display is low and the visibility is high.

SUMMARY OF THE INVENTION

The operating lifetime of an EC device is greatly enhanced by incorporating in the electrolyte a substance, hereinafter termed a "buffer" which minimizes change or rise in pH as the result of application of a voltage to activate or erase a display. The change in pH is local, occurring primarily in the immediate vicinity of the active electrode. For example, where the pH of the liquid is about 4.0, repetition of the color development and erasure through a number of cycles occurs. When the pH reaches 7.0 or higher, incomplete erasure results. The presence of a buffer overcomes this difficulty.

Accordingly, an object of the present invention is an electrochromic solution having a long operating lifetime as measured in cycles when used in a display cell.

Another object of the present invention is a display cell incorporating an electrochromic solution having a long operating lifetime as measured in terms of display cycles.

A further object of the present invention is a battery-powered electronic device incorporating a display cell using an electrochromic solution having a long lifetime.

An important object of the present invention is an electrochromic solution containing a substance, termed a buffer, which minimizes change in pH responsible for shortening the lifetime of electrochromic display cells.

Still other objects and advantages of the invention will in part be obvious and will in part be apparent from the specification.

The invention accordingly comprises a composition of matter possessing the characteristics, properties, and the relation of components which will be exemplified in the composition hereinafter described and articles incorporating such compositions, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

The present invention is based on research carried out with an aqueous solution of n, n'-diheptyl-4,4' hipyridinum bromide and its derivatives. The auxiliary electrolyte was potassium bromide. The pH of the electrolyte was found to be about 4.0. In attempting to determine the cause of incomplete erasure on reversing the voltage, the solution was investigated using a capillary electrode. With this electrode it was determined that the pH of the solution in the immediate vicinity of the acting electrode rose to the range of about 6.0 to 11.0 after a relatively short number of cycles. It was further established that when the pH reaches 7.0 or higher, incomplete erasure or retention of the image occurs.

A number of solutions were therefore prepared, each incorporating a compound which will prevent undue rise in the pH during cycling of the cell, said compound functioning as a buffer.

Figure 1:
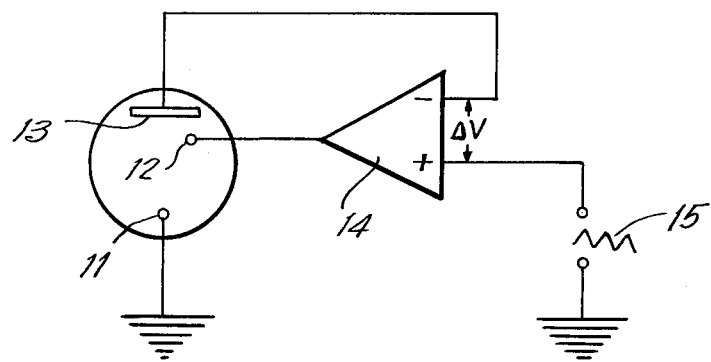
FIG. 1 is a potentiostatic driving circuit for an electrochromic device.
Figure 2A:
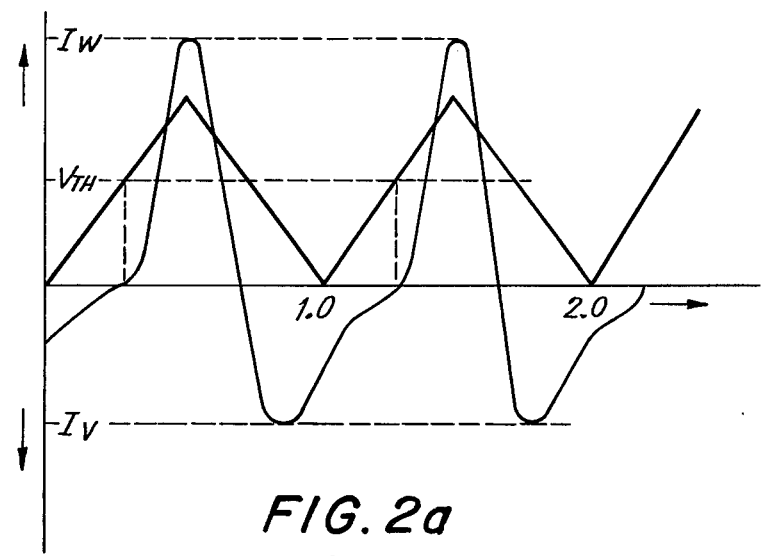
FIG. 2a is a graph of the current pattern after 1,000 cycles of a display cell using an electrochromic solution in accordance with the present invention.

A solution was prepared containing 5.7 cc of 0.1 N NaOH, 50.0 cc of 0.1 molar potassium primary arsenate and 44.3 g of water. This solution was used as the solvent for the above-mentioned EC material and auxiliary electrolyte. The cell employed the usual transparent electrodes such as are made of either tin oxide or indium oxide. Potentiostatic driving employing 3 terminals was used in order to have complete control of the liquid junction potential. FIG. 1 shows the driving circuit schematically. In this circuit color development and erasure are produced by acting electrode 11 and opposite electrode 12. Using this circuit and the solution described above, it was found that the change in the current value during color erasure was much smaller than the change in the conventional case using an electrolyte which does not incorporate a pH buffer. FIG. 2a shows the current pattern of a conventional cell using a conventional electrolyte of dilute aqueous sodium bicarbonate with an auxiliary electrolyte with an initial pH of 6.0. The current pattern shown is that observed after 1,000 cycles of color development and erasure.

Figure 2B:
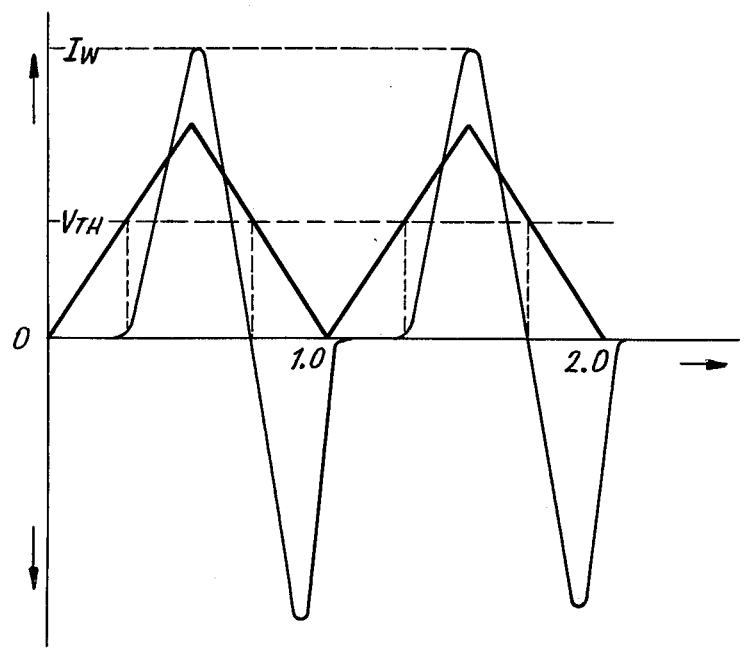
FIG. 2b is a current pattern for an electrochromic cell using a buffer solution in accordance with the present invention the pattern corresponding to cycling after 10,000 cycles.

A solution in accordance with the present invention, as described above, yields the current pattern shown in FIG. 2b after 10,000 cycles of color development and erasure. This pattern is identical with the initial pattern. The peak value of the erased current of a conventional cell after less than 1,000 cycles is greatly reduced, so that the color-erasing speed become low. Consequently, incomplete erasure and retention of the image occurs. The reason for this decrease in the erased current is thought to be as follows: Since the feedback current is applied between the acting electrode and the opposite electrode through an amplifier in order to hold constant the potential of the acting electrode against the reference electrode potential, the potential between the acting electrode and the opposite electrode exceeds by far the electrolysis voltage of water and KBr, thereby increasing the concentration of $OH^-$ ions. As a result, the color-erasing speed is greatly decreased, so that retention of the image occurs. On the other hand, as is shown in FIG. 2b, even after 10,000 cycles the current pattern of a cell using the above-mentioned buffer solution remains constant, there being no reduction in the erased current. This is considered to be due to the fact that the buffer solution prevents substantial change of the pH in the immediate vicinity of the electrode.

Tests have been carried out for over 500,000 cycles on solutions in accordance with the present invention without detecting any retention of the image, thereby conclusively showing that buffering a solution as disclosed herein greatly extends the life of electrochromic display solutions and devices employing same.

Another buffer solution designed to give a pH of 3.7 was prepared from 5.846 g of 0.1 N NaCl and 7.50 g of glycol made up to 1 liter with water. Into 95 cc of this solution were mixed 5 cc of 0.1 N of HCl, and enough electrochromic material was added to bring the concentration up to 0.1 molar. A solution in accordance with the prior art was also prepared for comparison with this second embodiment of the invention. The prior art solution consisted of 0.1 mol of EC and 0.3 mol of KBr dissolved in 1 liter of water. The pH was about 4.0.

The prior art solution made up to the relatively low pH showed some improvement over the usual electrochromic solutions in that the decay in the erased current began to be observed only after about 5,000 cycles. Nevertheless, the decay in the erase current did occur, and retention of the image was observed. In contrast, no decay in the erase current or retention of the image was observed after $3 \times 10^6$ cycles of writing and erasing once per second when using the solution prepared in accordance with the second embodiment of the invention.

A cell was prepared using silver plates as electrodes. As the driving circuit, a simple voltage inversion type using two terminals was employed in place of the potentiostatic driving circuit employing three terminals. This voltage-inversion type driving circuit is based on the extremely simple driving principle that the write and erase are performed by inverting the voltage between the electrodes of two terminals. When the color is produced on the electrode of one side, the color is erased on the electrode of the other side. When the voltage is inverted, color development and erasure are also reversed.

The composition of this third embodiment of the invention was 55 cc of 0.1 N HCl, 45 cc of 0.1 mol sodium secondary citrate and enough EC material to bring the concentration thereof to 0.1 molar. Sodium secondary citrate is disodium monohydrogen citrate; potassium primary arsenate, referred to above, is monopotassium dihydrogen arsenate.

To operate the cell, an inversion pulse voltage of 0.85 volts at a rate of 1 cycle per second was applied to the electrodes. Using solutions in accordance with the prior art, the retention of the image was generated after 200 to 300 cycles so that the operability of the display cell deteriorated seriously. However, using the buffer solution of the third embodiment of this invention, no change was found even after $1.5 \times 10^6$ cycles. It is therefore apparent that an extremely simple display cell providing a pulse driving only two electrodes can be used instead of the much more complex display cell utilizing an extremely complicated circuit and electrode configuration to provide potentiostatic driving by the use of one electrode for display and another electrode out of sight as is required to operate in accordance with the prior art.

As a fourth embodiment of the invention, potassium biphthalate is used as a buffer solution providing a pH of 4.0, the pH being relatively independent of temperature change. The driving method and the electrode material used were essentially those of the first embodiment. The display cell using this solution (incorporating EC and an auxiliary electrolyte, of course) showed virtually no change after 4 million cycles. Moreover, using this solution, an extremely stable and high contrast ratio of color produced is obtained.

Further tests showed that using various buffer solutions which held the pH to the range of 2.0 to 7.0 the life of the display cell was generally lengthened by a factor of at least 100 over that of display cells not incorporating a buffer. Further buffers found to be valuable are those listed in the following Table:

(1) HCl + KCl, pH ÷ 2
(2) HCl + acid potassium phthalate, pH ÷ 2 to 4.0
(3) HCl + sodium secondary citrate, pH ÷ 2.3 to 5.0
(4) NaOH + sodium secondary citrate, pH ÷ 5.0 to 6.5
(5) acetic acid, and phosphoric acid.

Figure 3:
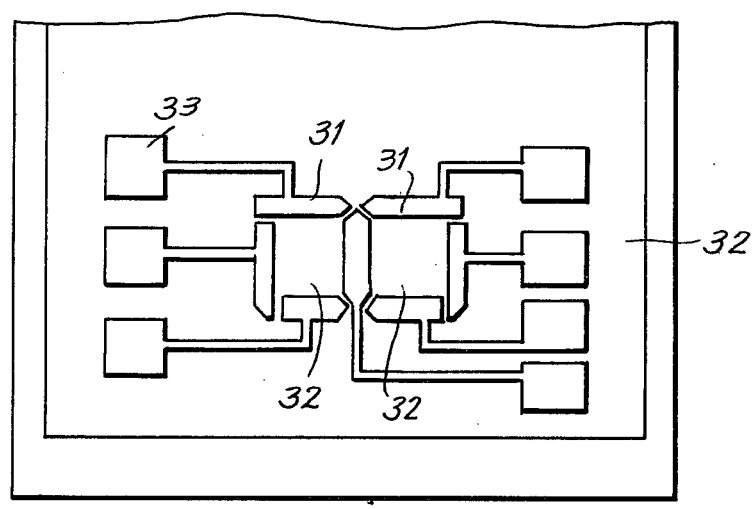
FIG. 3 represents a single digit of a transparent electrode pattern such as is used in a display cell of a wristwatch.
Figure 4:
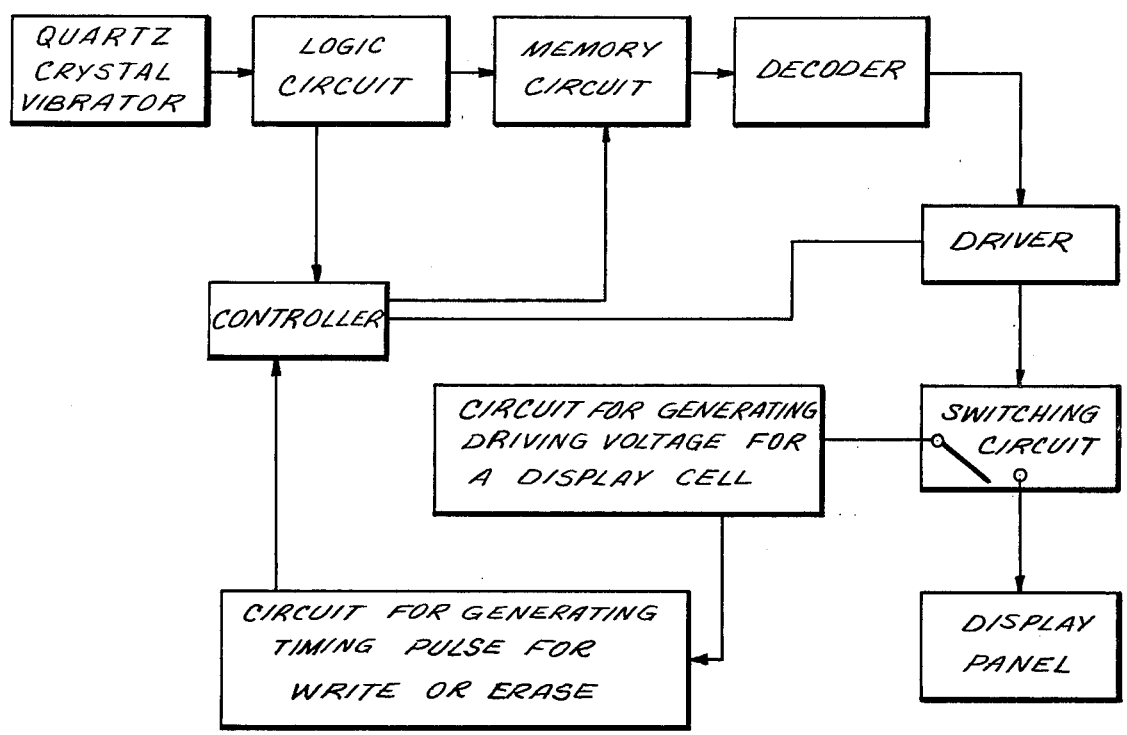
FIG. 4 is a diagram of a circuit for driving a wristwatch display cell.
Figure 5:
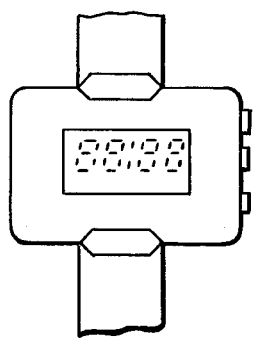
FIG. 5 is a plan view of a digital wristwatch having therein an electrochromic display cell.

As is evident from the above results, it is essential that the pH of the solution employed in an electrochromic cell be buffered to prevent undesired change in the pH, and particularly, rise in pH above about 7.2. A wristwatch having an electrochromic display incorporating a potassium biphthalate buffer solution designed to hold the pH at 4.00 was prepared and made ready for trial. The wristwatch as shown schematically in FIG. 5 was provided with driving circuitry for forming 4 digits to show the hour and the minute. These transparent electrodes were conventional compositions. Potentiostatic driving was used, with a triangular wave as the driving voltage. FIG. 4 is a block diagram of this driving circuit, and FIG. 3 is a plan view of one part of the electrode structure. The acting electrode and the reference electrode were made by forming patterns on the same glass plate as shown in FIG. 3, using the conventional etching technique. The opposite electrode was made by evaporating the transparent electrode over the entire back surface of the upper cover glass.

The driving principle of this wristwatch is as follows: As shown in FIG. 4, the pulse from the oscillation circuit which includes a quartz crystal vibrator is divided in the logic circuit, and applied to the memory circuit. Since this wristwatch is intended to display both the hour and the minute, it is provided with a memory circuit for memorizing a code signal for at least one minute. A controller is disposed in parallel with the memory circuit. This controller receives a timing pulse for writing or erasure (which is made by detecting the potential of the voltage for driving the display cell), and transmits it to the memory circuit. Simultaneously, the controller applies a signal to the driver. The switching circuit is actuated by an output signal from the driver, thereby feeding the numeric characters. The driving voltage is connected with the segments of the display cell only during writing. Immediately subsequently, the circuit is opened, and the same time is displayed for one minute by the memory characteristic of the display element. Next, when the erased signal is applied, the switching circuit is actuated once more, so that the erased voltage is applied to eliminate the display, successively feeding the numeric characters. Then, the write operation is performed again.

The circuit according to this invention consists of two MOS integrated circuit chips of a power circuit portion for driving a display cell and the other circuit portion. A quartz crystal vibrator is used as a standard signal force.

The wristwatch prepared for trial as described, showed an extremely excellent display effect of reddish-purple on a white ground which was independent of the condition of the lighting. Moreover, since the memory characteristic is utilized for the display, the power consumption can be lowered, so that the wristwatch can be actuated for about a year with a silver battery providing 1.5 volts. Moreover, retention of the image or uneven display is never generated as a result of the use of the buffer solution.

A buffered electrochromic electrolyte and a display cell utilizing such an electrolyte have very high value since they provide an effective display at low power, with high contrast and high reliability, such features being particularly valuable in a wristwatch or in an electronic table calculator. Moreover, the display cell can be made into a large-sized display panel much more readily than is the case when a liquid crystal display is used.

It will thus be seen that the objects set forth above, among those made apparent from the preceding description, are efficiently attained and, since certain changes may be made in the above composition of matter and in the article including said composition of matter, without departing from the spirit and scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A solution for use in an electrochromic display cell comprising an aqueous solution of a n,n'-diheptyl-4,4'-bipyridinium bromide,
    and a buffer means selected from the group consisting of NaOH and potassium primary arsenate; NaCl, glycol and HCl, HCl and sodium secondary citrate; potassium biphthalate; HCl and KCl; HCl and potassium acid phthalate; and NaOH and sodium secondary citrate, to prevent an increase in pH above about 7.2 when said solution is subjected to repeated application of voltage.

2. The solution as defined in claim 1, wherein said buffer means is such to maintain the pH in the range of 2.0 to 7.0.

3. A display cell incorporating the solution of claim 1.

4. A wristwatch having therein a display cell incorporating the solution of claim 1.